US 10,084,160 B2

United States Patent
Kuhne et al.

(10) Patent No.: US 10,084,160 B2
(45) Date of Patent: Sep. 25, 2018

(54) SHAPE-ADAPTED ELECTROCHEMICAL STORAGE DEVICE FOR UNIFORM TEMPERATURE DISTRIBUTION

(71) Applicant: SIEMENS AKTIENGESELLSCHAFT, Munich (DE)

(72) Inventors: Michael Kuhne, Furth (DE); Wolfgang Menapace, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 85 days.

(21) Appl. No.: 14/759,310

(22) PCT Filed: Dec. 19, 2013

(86) PCT No.: PCT/EP2013/077303
§ 371 (c)(1),
(2) Date: Jul. 6, 2015

(87) PCT Pub. No.: WO2014/108291
PCT Pub. Date: Jul. 17, 2014

(65) Prior Publication Data
US 2015/0349300 A1    Dec. 3, 2015

(30) Foreign Application Priority Data
Jan. 8, 2013   (EP) ..................... 13150480

(51) Int. Cl.
*H01M 2/02*   (2006.01)
*H01M 10/04*  (2006.01)
(Continued)

(52) U.S. Cl.
CPC ....... *H01M 2/0252* (2013.01); *H01M 10/049* (2013.01); *H01M 10/39* (2013.01);
(Continued)

(58) Field of Classification Search
CPC ............. H01M 2/0252; H01M 10/049; H01M 10/617; H01M 10/613; H01M 10/6554;
(Continued)

(56) References Cited

U.S. PATENT DOCUMENTS 4,048,393 A * 9/1977 Heintz ................ H01M 2/0252
                                                           429/104
4,868,072 A   9/1989 Abbin et al.
(Continued)

FOREIGN PATENT DOCUMENTS

CN       102244304 A1   11/2011
DE        19625424 A1    1/1997
(Continued)

OTHER PUBLICATIONS

Machine English translation of JP H05-166534 to Ando et al.*
(Continued)

*Primary Examiner* — Michael L Dignan
(74) *Attorney, Agent, or Firm* — Beusse Wolter Sanks & Maire

(57) ABSTRACT

An electrochemical storage device is provided including an anode chamber filled with anode material, and a cathode chamber filled with cathode material. The anode chamber is separated from the cathode chamber by ion-conducting solid body electrolyte, and is limited on one side at least partially by the solid body electrolyte, and to the other side at least partially by a wall surrounding at least partially the solid body electrolytes. The electrochemical storage device has a head part where electric energy is guided to and/or taken away from, a base part arranged opposite the head part, and at least one lateral part including at least one wall arranged between the head and base part. At least one first area and second area are formed between the wall and the solid body electrolyte, both areas being different with respect to the respective distance between the wall and solid body electrolyte.

15 Claims, 4 Drawing Sheets

(51) Int. Cl.
  *H01M 10/39* (2006.01)
  *H01M 10/6554* (2014.01)
  *H01M 10/617* (2014.01)
  *H01M 10/613* (2014.01)

(52) U.S. Cl.
  CPC ....... *H01M 10/399* (2013.01); *H01M 10/613* (2015.04); *H01M 10/617* (2015.04); *H01M 10/6554* (2015.04); *Y10T 29/4911* (2015.01)

(58) Field of Classification Search
  CPC ............... H01M 10/39; H01M 10/399; H01M 10/3909; H01M 10/3936; H01M 10/3945; H01M 10/3954; Y10T 29/4911
  See application file for complete search history.

(56) References Cited

U.S. PATENT DOCUMENTS

| | | | | |
|---|---|---|---|---|
| 5,269,988 A | * | 12/1993 | Coetzer | B22F 5/06 264/109 |
| 5,763,117 A | | 6/1998 | Meintjes | |
| 2010/0178546 A1 | | 7/2010 | Huang | |
| 2012/0164524 A1 | * | 6/2012 | Bogdan, Jr. | H01M 10/39 429/199 |
| 2013/0084486 A1 | * | 4/2013 | Rahmane | H01M 2/0252 429/163 |

FOREIGN PATENT DOCUMENTS

| | | |
|---|---|---|
| EP | 2541646 A1 | 1/2013 |
| JP | S49101830 A | 9/1974 |
| JP | H05166534 A | 7/1993 |
| JP | H05266921 A | 10/1993 |
| JP | H08329980 A | 12/1996 |
| JP | H09161632 A | 6/1997 |
| JP | 2010514142 A | 4/2010 |
| WO | 2008079563 A2 | 7/2008 |
| WO | 2013048706 A1 | 4/2013 |

OTHER PUBLICATIONS

CN Office Action dated Sep. 20, 2016, for CN application No. 201380074340.2.

JP Office Action dated Jul. 21, 2016, for JP application No. 2015-551158.

* cited by examiner

SHAPE-ADAPTED ELECTROCHEMICAL STORAGE DEVICE FOR UNIFORM TEMPERATURE DISTRIBUTION

CROSS REFERENCE TO RELATED APPLICATIONS

This application is the US National Stage of International Application No. PCT/EP2013/077303 filed Dec. 19, 2013, and claims the benefit thereof. The International Application claims the benefit of European Application No. EP13150480 filed Jan. 8, 2013. All of the applications are incorporated by reference herein in their entirety.

FIELD OF INVENTION

The present invention relates to an electrochemical storage device which has an anode compartment filled with an anode material and a cathode compartment filled with a cathode material, wherein the anode compartment is separated from the cathode compartment by an ion-conductive solid electrolyte, and wherein the anode compartment is delimited on one side at least in part by the solid electrolyte and on another side at least in part by a wall which at least in part surrounds the solid electrolyte, wherein the electrochemical storage device has a top part, at which electrical energy may be fed in or out, a bottom part arranged opposite the top part, and at least one side part which comprises the at least one wall and is arranged between the top part and bottom part. The invention additionally relates to a method for producing such an electrochemical storage device.

BACKGROUND OF INVENTION

The electrochemical storage device described and claimed here takes the form of a high-temperature storage device which requires a minimum temperature of at least 100° C. as its operating temperature. In particular, the operating temperature is between 200° C. and 350° C., wherein the operating temperature must be of such a level that the solid electrolyte comprised by the electrochemical storage device is sufficiently ion-conductive for it to have the lowest possible internal resistance for the electrochemical storage device. Higher operating temperatures, for instance up to 500° C., are likewise conceivable. Typical electrochemical storage devices to which the invention relates are, for example, those based on sodium-nickel chloride cell (NaNiCl$_2$ cells) or sodium-sulfur cell (NaS cells) technology. Various embodiments of these cells are known.

The structure of a conventional electrochemical storage device based on sodium-nickel chloride cell technology has a negative electrode which takes the form of the anode during discharging operation, the anode material of which assumes the form of liquid sodium at operating temperature. Said sodium typically fills part of the anode compartment during operation. The positive electrode during discharging operation, which takes the form of a cathode, has a cathode compartment which is at least in part filled by a suitable metal, for instance nickel, mixed with a likewise suitable salt, for instance NaCl, and for instance further suitable additives, such as for example AlCl$_3$ or NaAlCl$_4$. At the operating temperature of the electrochemical storage device, the mixture of these substances typically at least in part takes the form of a liquid electrolyte.

The anode compartment and cathode compartment are separated by a solid electrolyte which, as a ceramic separator, is permeable only to ions. The solid electrolyte is not intended to permit any mass exchange other than that involving the ions. Typical solid electrolytes which are used in sodium-nickel chloride cells comprise β-Al$_2$O$_3$ or β"-Al$_2$O$_3$ as the ceramic material. This permits a specific ion conductivity for Na$^+$ ions which may be transported between the anode compartment and cathode compartment through the solid electrolyte depending on the potential gradient. The reactions which respectively proceed during charging operation or discharging operation are revealed for example by the following reaction equation (discharging operation from left to right; charging operation from right to left):

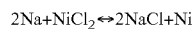

At the equilibrium state, a voltage of approx. 2.58 V may accordingly arise between the anode and cathode.

In order to enlarge the active surface of the anode material resting against the solid electrolyte which is available for said ion exchange, spring metal sheets are typically arranged in the anode compartment which in part rest against the solid electrolyte and in part rest against the wall surrounding said solid electrolyte. The spring metal sheets are on average only slightly spaced from the solid electrolyte such that, at operating temperatures at which the anode material is in the liquid phase, said anode material is moved by capillary action between the solid electrolyte and the spring metal sheet against the effect of gravity in such a manner that it is located above the filling level present in the anode compartment during operation. Even when the filling level of the electrochemical storage device with anode material is relatively low, it is in this respect possible to enlarge the active surface of the anode material brought into contact with the solid electrolyte. The solid electrolyte is consequently also sufficiently wetted above the filling level of the remaining anode material in the anode compartment, wherein the internal resistance of the storage device is accordingly reduced when the electrochemical storage device is in operation.

However, as a result of construction factors, it is not possible to ensure, despite these technical precautions, that the film of the anode material brought in this manner into contact with the solid electrolyte has a sufficiently uniform thickness distribution. In this respect, during current flow in both charging and discharging operation, nonuniformities in heat distribution sometimes occur over the region of the solid electrolyte wetted with the anode material. Depending on the filling level in the anode compartment, when the electrochemical storage device is in operational orientation, heat is in fact dissipated in the bottom region from the solid electrolyte via the liquid metal outwards to the side part, wherein in the region of the top part of the electrochemical storage device, because the anode compartment is incompletely filled with anode material, heat dissipation can only proceed via the upper region of the anode compartment otherwise still filled with gas. In the bottom region, direct thermal conduction outwards to the side part mediated by the liquid metal is thus possible, which is distinctly more favorable than the indirect thermal conduction in the top region which is mediated via a gas region.

When the electrochemical storage device is subjected to high electrical loads, undesirable temperature gradients may therefore form which lead to mechanical stresses in the solid electrolyte. Such stresses in turn have a negative impact on the service life of the electrochemical storage device. It is accordingly for example known that electrochemical storage devices exposed to particularly severe thermal loads have a distinctly shorter cycle life than those storage devices which are operated at a lower current density for charging or discharging. However, this undesirably restricts the power densities of the electrochemical storage devices which are achievable for specific applications and simultaneously also reduces the flexibility and usability of storage devices based on this technology.

For example, if one of the storage devices in a module provided with such electrochemical storage devices fails, it has been found that the majority of such failures are attributable to an electrical short circuit within the electrochemical storage device. As a consequence, the anode material may sometimes react directly with the cathode material or the potential gradient may sometimes break down, since, once it has been damaged, the solid electrolyte then permits extensive, substantially free mass exchange or an electrically conductive short-circuit connection is formed. Due to the electrochemical short circuit in the storage device, the latter is no longer in a position, for instance, to contribute a proportion of the total voltage of the module in which the storage device is interconnected, whereby the total voltage of the module falls. When individual electrochemical storage devices are connected in series in the module, this merely results in clearly foreseeable declines in the total voltage. However, when a plurality of modules are connected in parallel, mixed potentials may occur, which expose the modules already damaged by the failure of individual electrochemical storage devices to higher charging or discharging current densities, such that already existing damage in individual electrochemical storage devices may sometimes be made even worse. One consequence would be increasing failure of individual electrochemical storage devices in the module which is already damaged, i.e. provided with one or more already short-circuited storage devices, and hence as a result ultimately failure of the entire module. Another consequence would be a steady decrease in the usable storage capacity of the interconnected modules, since modules without storage devices which have failed would only be partially charged or discharged due to the mixed potentials which arise.

SUMMARY OF INVENTION

An object of the present invention is now to propose an electrochemical storage device which is capable of avoiding these disadvantages from the prior art. In particular, the intention is to propose an electrochemical storage device which permits advantageous cooling or heat dissipation of such an electrochemical storage device. It is furthermore desirable to achieve maximally uniform heat dissipation of the heat arising in the contact region between solid electrolyte and anode material outwards to the side part, it being desired largely to avoid temperature gradients. It is furthermore desirable to use components for conventional electrochemical storage devices which involve only slight effort in order to be able to provide an embodiment which has heat dissipation to the side part which is of such an advantageous nature. A further object of the present invention is likewise to propose a method for producing such an electrochemical storage device.

The objects underlying the invention are achieved according to the invention by an electrochemical storage device as claimed and by methods for producing such an electrochemical storage device as claimed.

The objects underlying the invention are in particular achieved by an electrochemical storage device which, when in ordinary operation, has an anode compartment filled with an anode material and a cathode compartment filled with a cathode material, wherein the anode compartment is separated from the cathode compartment by an ion-conductive solid electrolyte, and wherein the anode compartment is delimited on one side at least in part by the solid electrolyte and on another side at least in part by a wall which surrounds the solid electrolyte at least in part, wherein the electrochemical storage device has a top part, at which electrical energy may be fed in or out, a bottom part arranged opposite the top part, and at least one side part which comprises the at least one wall and is arranged between the top and bottom part, wherein there are provided between the wall and solid electrolyte at least one first region and one second region, which two regions differ by the respective spacing of the wall from the solid electrolyte.

The objects underlying the invention are furthermore achieved by a method for producing an electrochemical storage device, in particular an electrochemical storage device as described previously and also as described below, which method comprises the following steps: —providing an ion-conductive solid electrolyte; —providing a wall; —forming the wall and —surrounding the solid electrolyte with the formed wall such that, on completion of the electrochemical storage device, there are provided between the wall and solid electrolyte at least one first region of an anode compartment and one second region of an anode compartment, which two regions in each case differ by the spacing of the wall from the solid electrolyte.

The objects underlying the invention are furthermore achieved by a method for producing such an electrochemical storage device, in particular an electrochemical storage device as described previously and also below, which method comprises the following steps: —providing a solid electrolyte which has a change in shape and is also ion-conductive; —providing a wall; —surrounding the solid electrolyte with the wall such that, on completion of the electrochemical storage device, there are provided between the wall and solid electrolyte at least one first region of an anode compartment and one second region of an anode compartment, which two regions in each case differ by the spacing of the wall from the solid electrolyte.

According to a typical and advantageous embodiment of the electrochemical storage device, which is based on sodium-nickel chloride cell technology, the anode material is sodium.

According to one embodiment in which the electrochemical storage device is based on sodium-nickel chloride cell technology, the cathode material is typically a mixture of a metal (Ni) with at least one salt (NaCl) and typically at least one further additive (for example $AlCl_3$ or $NaAlCl_4$). The mixture of the salt or of the additive at least in part assumes the form of a liquid electrolyte melt at operating temperature.

According to aspects of the invention, the solid electrolyte permits the exchange of ions between anode compartment and cathode compartment. This does not, however, also involve any mass exchange which may for instance be understood to be an exchange of fluid or solid. The solid electrolyte is furthermore typically configured to be selective for conducting specific ions of the anode material. According to sodium-nickel chloride cell technology, the solid electrolyte is selectively conductive to $Na^+$ ions. Depending on the embodiment, however, it may also be selectively conductive to other ionic species, for instance for $Li^+$ or $K^+$ ions.

In addition to closing the storage device, the top part of the electrochemical storage device also serves to contact the storage device electrically with electrical leads in order to feed electrical energy in or out. When the storage device is in operational orientation, the bottom part here typically serves to support the storage device on a surface which is not further specified.

It should be noted that the spacing according to the invention of solid electrolyte and wall relates to the mean spacing of the two. The latter may readily be determined on the basis of conventional averaging methods. The spacing of the wall from the solid electrolyte may accordingly, for example, be determined by a straight line passing through the wall and the solid electrolyte, wherein the points of intersection indicate the respective spacing. The straight line here for example extends perpendicularly to the surface of the solid electrolyte or perpendicularly to the wall surrounding the solid electrolyte. The mean spacing is obtained for example from a representative number of individually determined spacings which are associated with individual points over the first or second region of the electrochemical storage device. The mean spacing may be calculated from these individual spacings by summing the latter, wherein the result is divided by the number of individual spacings. In particular, integrative averaging, which may also be weighted, may be performed. According to the embodiment, the determination method may also combine different determinations.

It should also be noted at this point that, in the event that a described technical mode of action of individual technical features is intended to be dependent on the orientation of the electrochemical storage device in space, it should be assumed that the orientation is to be determined relative to the earth's gravitational field as during operation of the storage device. The bottom part of the electrochemical storage device is accordingly located closer to the earth's core than the top part. The orientation is additionally such that the connection between the top part and bottom part is arranged substantially parallel to the direction of the gravitational field.

The inventive concept is based on the circumstance that the electrochemical storage device has a first region in which the solid electrolyte has a different spacing from the wall than in the second region. If anode material is located in the anode compartment during operation of the electrochemical storage device, this different spacing gives rise to a filling level and degree of wetting of the surface of the solid electrolyte which differ from the electrochemical storage device known from the prior art. If, for example, the first region is constructed such that a smaller distance prevails between the wall and solid electrolyte than in the second region, wherein during proper use of the electrochemical storage device the first region is arranged closer to the earth's core, a higher filling level may also be achieved in the anode compartment even with a smaller quantity of anode material.

This filling level simultaneously ensures improved wetting of the solid electrolyte or improved heat dissipation, since the anode material now enables direct heat dissipation in the first region of the anode compartment.

Due to the different spacing between the wall and solid electrolyte in the first region and in the second region, it is thus now possible purposefully to influence the filling level of the storage device in an advantageous manner for predetermined states of charge or discharge of the electrochemical storage device. Given suitable selection of the spacing between the wall and solid electrolyte, it is in particular also possible to dispense with the provision of the above-described spring metal sheets, so giving rise to a manufacturing cost benefit. Accordingly, the electrochemical storage device according to the invention is already capable, even at a low state of charge, of ensuring sufficiently good wetting of the solid electrolyte with the anode material, in particular in order to ensure uniform heat distribution and heat dissipation during operation. Accordingly, at identical electrical load, the service life of the electrochemical storage device may be extended or power tolerance may be increased with an unchanged service life.

The described spring metal sheets may now instead take the form of spring elements of a simple design which substantially protect the storage device from mechanical effects. The spring elements additionally require lower manufacturing tolerances, since they now no longer have to be spaced at a defined distance from the solid electrolyte. Like the previously described spring metal sheets, the more simply designed spring elements may also provide current conduction for first charging of the storage device, since they are simultaneously in contact with an electron-conductive layer on the solid electrolyte and the conductive wall.

The solution according to the invention furthermore permits use of components of conventional electrochemical storage devices, wherein for instance the solid electrolyte together with the cathode material of the cathode compartment defined by the solid electrolyte is provided with a new wall which embodies the features according to the invention on completion of the storage device. In this respect, numerous components of a conventional electrochemical storage device may also be used.

It should also be mentioned at this point that the side part is typically metallic. In this respect, the side part mediates advantageous heat dissipation of the thermal energy generated in the electrochemical storage device. The side part likewise permits electrical contacting. In particular, the side part provides the contacting surface for the anode.

A first embodiment of the invention provides that the wall has a formed portion which separates the first region and the second region from one another. Such a formed portion may readily be obtained by conventional forming methods. Consequently, the manufacturing effort involved in the electrochemical storage device according to the embodiment is relatively low, such that said device may also be mass-produced in an automated manner.

A further embodiment of the invention provides that the solid electrolyte has a change in shape which separates the first region and the second region from one another. A change in shape should here and hereinafter merely be taken to mean a changing circumferential shape of the solid electrolyte. Due to the typical manufacturing method for solid electrolytes, subsequent forming, as for instance with metallic workpieces, is not possible. The change in shape according to the embodiment however likewise permits readily controllable production methods for manufacturing the electrochemical storage device inexpensively and in large numbers.

A further aspect of the invention may also provide that the transition from the first region to the second region has a taper of the spacing between the wall and the solid electrolyte. A taper should here be taken to mean a continuous transition which should be considered to be mathematically differentiable. It is accordingly to be expected that corresponding changes in filling level of the anode material in the anode compartment will in each case also be accompanied by a change in the wetting of the solid electrolyte with anode material. The formation of hot spots, i.e. regions which are exposed to particularly high thermal stress, may thus be reduced or even avoided. Such regions may arise, for instance, if the taper is not continuous in form, but is instead for instance stepped.

A further aspect of the invention may also provide that the second region has a plurality of tapers of the spacing between the wall and the solid electrolyte, and in particular the first region has a substantially uniform spacing between the wall and the solid electrolyte.

A further embodiment of the electrochemical storage device provides that the first region and the second region are in each case differently spaced from the top part and the bottom part. The spacing here again relates to a distance averaged over the first or second region. The centroid of the respective regions may, for example, be used for determining the spacing. In particular when the electrochemical storage device is in proper use and in the proper orientation, the two regions may perform a different function. If the first region is arranged for instance closer to the bottom part, said region serves to improve wetting of the solid electrolyte with anode material and simultaneously to improve heat dissipation directly via the anode material located in the first region, wherein the second region may substantially serve as a reservoir for anode material. Accordingly, during charging of the electrochemical storage device, relatively more anode material may accumulate for example in the second region, in which the wall is spaced further from the solid electrolyte than in the first region, which material is again available during discharging.

According to a further advantageous aspect of the invention, the electrochemical storage device may have a longitudinal axis L which is an axis of symmetry for at least one first portion of the solid electrolyte and simultaneously an axis of symmetry for at least one second portion of the wall, wherein the first portion at least in part delimits the first region and the second portion likewise at least in part delimits the first region. The term "portion" should here be taken to mean a surface portion. According to the embodiment, an axis of symmetry may be an axis of rotational symmetry or indeed describe another form of symmetry. An axis of symmetry is in particular present when there is a straight line such that, at each point of the first or second portion, there is a further point of the first or second portion respectively, such that the connecting segment of these straight lines is bisected at right angles. The axis of symmetry may additionally also be a straight line located in a plane of symmetry and so represents an instance of planar symmetry. Surface symmetry in respect of this plane is therefore present. Thanks to symmetry according to the embodiment, heat dissipation may advantageously proceed particularly favorably. In particular in the case of rotational symmetry, the heat to be dissipated from the storage device may be dissipated via substantially all the regions of the side part.

One particular embodiment of the invention provides that the second region has a plurality of tapers of the spacing of the wall or side part from the solid electrolyte, and in particular the first region has a substantially uniform spacing between the wall and solid electrolyte. The plurality of tapers are in particular arranged in the circumferential direction of the electrochemical storage device, in particular perpendicular to the longitudinal direction L of the electrochemical storage device. Accordingly, the wall in the first region may also have a suitable shape, whereas for instance the side part of the second region does not have such a shape and is for instance only of uniform shape. Such a uniform shape is for instance cross-sectionally round, rectangular, triangular, etc. Such an embodiment takes account of the typical shape of the solid electrolyte, which may have a cross-sectionally undulating circumferential shape. In particular, the circumferential shape may have four, six, eight or even ten crests and troughs. If the circumferential shape has four crests and four troughs, said shape may be approximately cloverleaf in shape.

A further embodiment of the invention provides that the wall is comprised by a can which at least in part surrounds the solid electrolyte. The can here in particular comprises the side part and bottom part of the electrochemical storage device. The electrochemical storage device may be produced in particularly simple manner in this case.

One embodiment likewise provides that, according to a further aspect of the invention, the wall of the electrochemical storage device is uniformly spaced from the solid electrolyte in the first region. Uniform spacing should be taken to mean that all the surface elements of the wall are substantially identically spaced from the solid electrolyte.

It is likewise possible for the wall to be uniformly spaced from the solid electrolyte in the second region.

In this case, substantially all the surface elements of the wall are in turn substantially uniformly spaced from the solid electrolyte. An advantageous embodiment, however, also has a changing or regularly changing or cyclically changing spacing between the wall and solid electrolyte.

One particular embodiment of the invention provides that the wall is spaced from the solid electrolyte in the first region by at most 3 mm, particularly by at most 1.5 mm. Smaller spacing values, for instance of 1 mm and less, may also be considered. Due to the small spacing between the wall and solid electrolyte, the space which is provided in the first region between the wall and solid electrolyte is filled from even a low state of charge of the electrochemical storage device.

A further embodiment of the invention provides that the wall is spaced from the solid electrolyte in the second region by on average at least 4 mm, particularly at least 6 mm. Larger spacing values, for instance 10 mm and more, are definitely considered. Due to this relatively larger spacing in the second region, the space between the wall and solid electrolyte in the second region may be used as a reservoir for anode material of the anode compartment. The spacing according to the embodiment also makes it straightforwardly possible to reproduce the geometry of conventional cells.

According to one advantageous embodiment of the electrochemical storage device, the ratio of the spatial volume which is determined by the first region between the wall and solid electrolyte to the spatial volume which is determined by the second region between the wall and solid electrolyte, is at most 60%, particularly at most 30%. The space between the wall and solid electrolyte in the first region accordingly requires a relatively small filling volume in order to be completely filled with anode material. It is accordingly advantageously possible, even at a relatively low state of charge, to dissipate heat present in the first region outwards to the side part.

According to one particularly advantageous embodiment of the invention, the space which is determined by the first region between the wall and solid electrolyte is completely filled by anode material when the electrochemical storage device is at full charge, wherein the space which is determined by the second region between the wall and solid electrolyte is filled only in part by anode material. Accordingly, the space in the second region may in turn be used as a reservoir for the anode material, wherein the space in the first region will already be completely filled with anode material even at a relatively low state of charge.

A further embodiment of the invention provides that the space which is determined by the first region between the wall and solid electrolyte is completely filled by anode material at just 60% of the full charge of the electrochemical storage device, particularly is completely filled by anode material at just 40% of the full charge of the electrochemical storage device. The charging state according to the embodiment here in particular relates to the quantity of stored charge or to the quantity of anode material located in the anode compartment.

According to a further embodiment of the invention, during proper use of the electrochemical storage device, the space which is defined by the second region between the wall and solid electrolyte takes the form of a storage reservoir for the anode material.

A likewise advantageous embodiment of the electrochemical storage device provides that at least one spring element is arranged in the first region between the wall and solid electrolyte, which spring element is in contact with both the wall and the solid electrolyte but does not form a capillary zone in which the anode material in the liquid state of matter is moved by capillary action between the solid electrolyte and the spring element to improve wetting of the solid electrolyte at operating temperature. The at least one spring element thus in particular only has a mechanical damping action, for instance on exposure of the storage device to mechanical forces. In addition, the spring element also provides electrical contacting for instance for initial charging of the electrochemical storage device when the latter is first commissioned.

The invention will now be illustrated in detail with reference to individual figures. The figures should here be taken to be merely diagrammatic and do not limit the present invention with regard to the practicability thereof.

It should furthermore be noted that identical features or identically acting features are described by identical reference signs.

Moreover, the individual features shown in the following figures are claimed for themselves alone as well as in any desired combination with other features, insofar as said combination may be considered to fall within the present inventive concept.

DETAILED DESCRIPTION OF INVENTION

Figure 1:
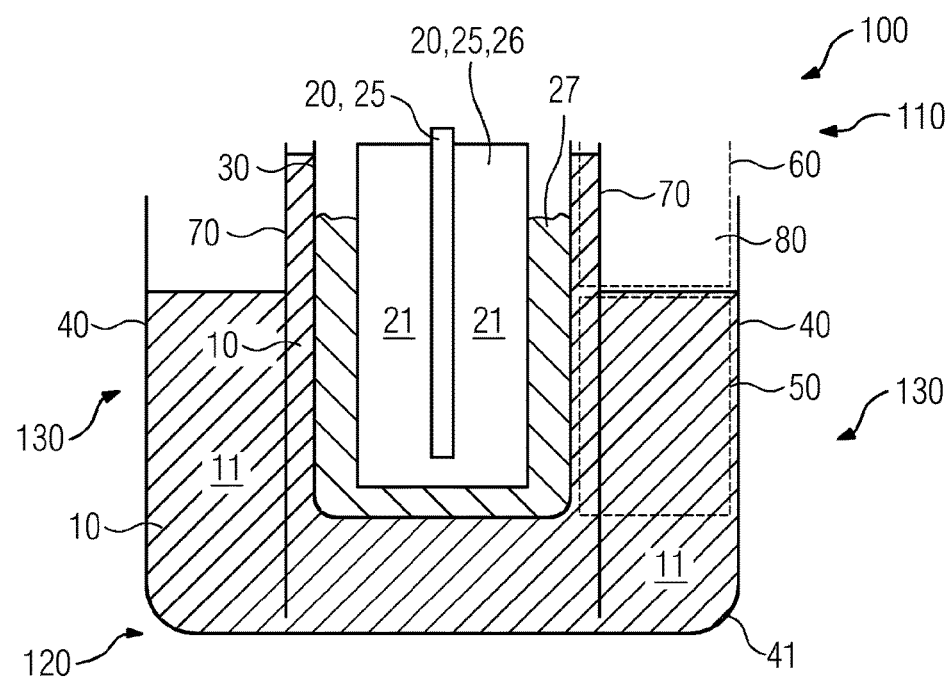
FIG. 1 shows an embodiment of an electrochemical storage device according to the prior art in a schematic diagram as a lateral sectional view through the central longitudinal axis.

FIG. 1 shows an embodiment of an electrochemical storage device 100, as known from the prior art, in lateral sectional view. The electrochemical storage device 100 here comprises an anode compartment 11 separated from a cathode compartment 21 by a solid electrolyte 30. The solid electrolyte 30 is here of can-shaped construction. During charging of the electrochemical storage device 100, the anode compartment 11 is at least in part filled with anode material 10. According to sodium-nickel chloride cell technology, the anode material 10 is elemental sodium which is in the liquid phase at the operating temperature of the storage device 100 (between 200° C. and 350° C.).

The cathode compartment is in turn filled by the cathode material 20, wherein the filling level of the liquid cathode electrolyte 27 in the cathode compartment correlates, depending on the state of charge of the electrochemical storage device 100, with the filling level of the liquid anode material 10 in the anode compartment 11. In the present case, the cathode material 20 in particular comprises a metallic cathode 25, together with a cathode salt 26 and a cathode electrolyte 27. According to sodium-nickel chloride cell technology, the cathode 25 takes the form of metallic nickel bar or wire in electrical contact with nickel powder, while the cathode salt 26 is NaCl, wherein the cathode electrolyte 27 takes the form of a mixture of various salts and substances which arise during operation of storage device 100.

In the region of the top part 110 of the electrochemical storage unit 100, the cathode 25 additionally permits electrical contacting in order to feed electrical charges in or out, depending on the state of charge or discharge. The anode of the electrochemical storage device 100 is formed by the side part 130 which is made of metal. The side part 130 is in turn part of a can 41 which comprises both the bottom part 120 and the side part 130. The electrochemical storage device 100 is sealed in the region of the top part 110 in accordance with teaching known from the prior art.

The solid electrolyte 30 comprised by the electrochemical storage device 100 permits a specific ion conductivity, but without enabling any further mass exchange between the anode compartment 11 and cathode compartment 21. According to sodium-nickel chloride cell technology, the solid electrolyte 30 takes the form of $\beta$-$Al_2O_3$ or $\beta''$-$Al_2O_3$ and thus enables selective $Na^+$ conductivity. As a consequence, on charging of the electrochemical storage device 100, the $Na^+$ ions are capable of migrating from the cathode compartment into the anode compartment, wherein they are reduced there to elemental sodium by the provision of electrons. Over the course of the charging process, said elemental sodium accumulates to an increasing extent in the anode compartment.

If the electrochemical storage device 100 is discharged, $Na^+$ ion transport proceeds in the opposite direction, wherein sodium is oxidized at the interface between the solid electrolyte 30 and the anode material 10, after which the resultant $Na^+$ ion migrates through the solid electrolyte 30 into the cathode compartment 21. The filling level of anode material 10 in the anode compartment 11 and of cathode electrolyte 27 in the cathode compartment 21 thus differs depending on the state of charge or discharge.

In order to reduce the internal resistance of the electrochemical storage device 100 and simultaneously permit elevated charge transport through the solid electrolyte 30, the electrochemical storage device 100 provides a spring metal sheet 70 (in the present case shown as two separate spring metal sheets 70) which is arranged in the anode compartment 11 spaced only a very small distance from the surface of the solid electrolyte 30. The spacing of the spring metal sheet 70 from the surface of the solid electrolyte 30 is here sufficiently small that, during operation of the electrochemical storage device 100, when the anode material 10 assumes liquid form, liquid anode material 10 may be moved by capillary action between the spring metal sheet 70 and solid electrolyte 30 contrary to the effect of gravity of the earth. It is here assumed that the operational arrangement of the electrochemical storage device 100 is such that the bottom part 120 is arranged closer to the earth's core than the top part 110.

Due to the capillary action and due to the filling level of anode material 10 which arises in the anode compartment 11, two regions 50, 60 are formed in the present case which enable different heat dissipation from the electrochemical storage device 100 to the side part 130. The first region 50, which is arranged closer to the bottom part 120, is determined by the solid electrolyte 30 and the wall 40 of the side part 130, wherein the space determined by the first region 50 is completely filled by anode material 10.

In the first region 50, the electrochemical storage device 100 thus permits relatively efficient and direct thermal conduction through the anode material 10 present in said first region 50. A second region 60, which is arranged closer to the top part 110 of the electrochemical storage device 100 is on the contrary not completely filled with anode material 10. Since the filling level in the anode compartment 11 does not extend into the second region 60, heat dissipation initially proceeds via the liquid anode material 10 held by capillary action between the solid electrolyte 30 and spring metal sheet 70, then onward through the spring metal sheet 70 and still later thereafter through the gas compartment 80 which is not filled with anode material 10. Due to the substantially poorer thermal conductivity of said gas compartment 80 in comparison with the first region 50, the heat generated during operation of the electrochemical storage device cannot be comparably efficiently dissipated outwards to the side part 130. In particular in that region where the first region 50 and second region 60 adjoin one another (this substantially corresponds to the location of the filling level of the anode material 10), this results in severe thermal stresses. Such stresses in turn bring about more rapid material fatigue in particular in the solid electrolyte 30, whereby any breakthrough of the solid electrolyte 30 results in a short circuit of the electrochemical storage device 100.

Figure 2:
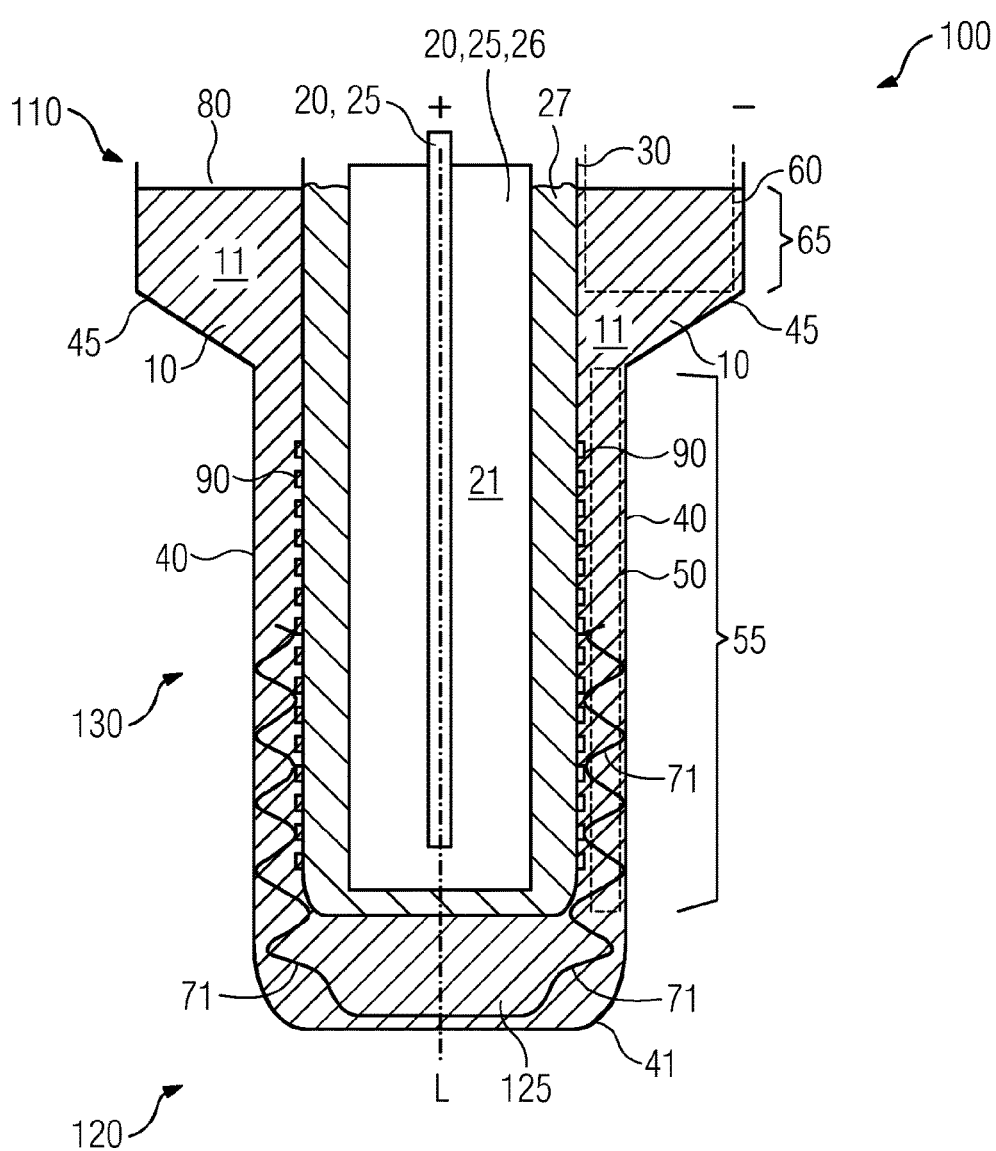
FIG. 2 shows a first embodiment of the electrochemical storage device according to the invention in a schematic diagram as a lateral sectional view through the central longitudinal axis.

FIG. 2 shows an embodiment of an electrochemical storage device 100 according to the present invention. The electrochemical storage device 100 here differs from the storage device 100 shown in FIG. 1 primarily in that the side part 130 has a wall 40 which in turn comprises a formed portion 45. The formed portion 45 makes it possible to determine two different regions 50 and 60 in which, during continuous charging or discharging of the electrochemical storage device 100, the rate of change in filling level differs in each case. The quantity of anode material 10 which is located in the space of these regions 50 and 60 also differs (N.B.: the definition of first region 50 and second region 60 according to FIGS. 2 and 3 does not correspond to the definition of the first region 50 and second region 60 according to FIG. 1. The definition selected for FIG. 1 merely serves to facilitate understanding).

Due to the smaller spacing between the wall 40 and solid electrolyte 30 in the first region 50, namely in a region between the formed portion 45 and the bottom part 120, a large area of the solid electrolyte 30 is wetted even at a relatively low state of charge. Since the anode compartment 11 in the first region 50 is already completely filled with liquid anode material 10 at a relatively low state of charge, heat is efficiently and advantageously directly dissipated to the side part 130 via the anode material 10. The behavior is different in the second region 60 which is arranged between the formed portion 45 and the top part 110. Here, the space of the second region 60 is only completely filled with anode material at a relatively high state of charge, such that direct heat transfer to the side part 130 is only possible at such filling levels. In this respect, the space of the second region 60 is primarily provided as a reservoir for anode material 10.

The electrochemical storage device 100 furthermore has a spring element 71 which, in comparison with the spring metal sheet 70 shown in FIG. 1, has a different geometric shape. The spring element 71 shown in the present case initially performs a contacting function in order to create an electrical contact between the metallic side part 130 and the surface of the solid electrolyte 30 which has additionally had a conductive layer 90 applied. This contact is in particular required during initial charging of the electrochemical storage device 100, since at this point in time no anode material 10, which is capable of mediating an electrical contact to the side part 130, is yet present in the anode compartment 11.

The spring element 71 further performs a mechanical protective function, since, thanks to corrugations, it is capable of damping impacts acting externally on the electrochemical storage unit 100 and thus of reducing mechanical loads on the solid electrolyte 30.

Similarly to the storage units 100 known from the prior art, the present embodiment also has a dead volume in the bottom region 125 close to the bottom part 120, the purpose of which dead volume is in particular to collect contaminants which form during operation of the electrochemical storage device 100 without their impairing electrical and thermal conduction between the solid electrolyte 30 and side part 130.

Figure 3:
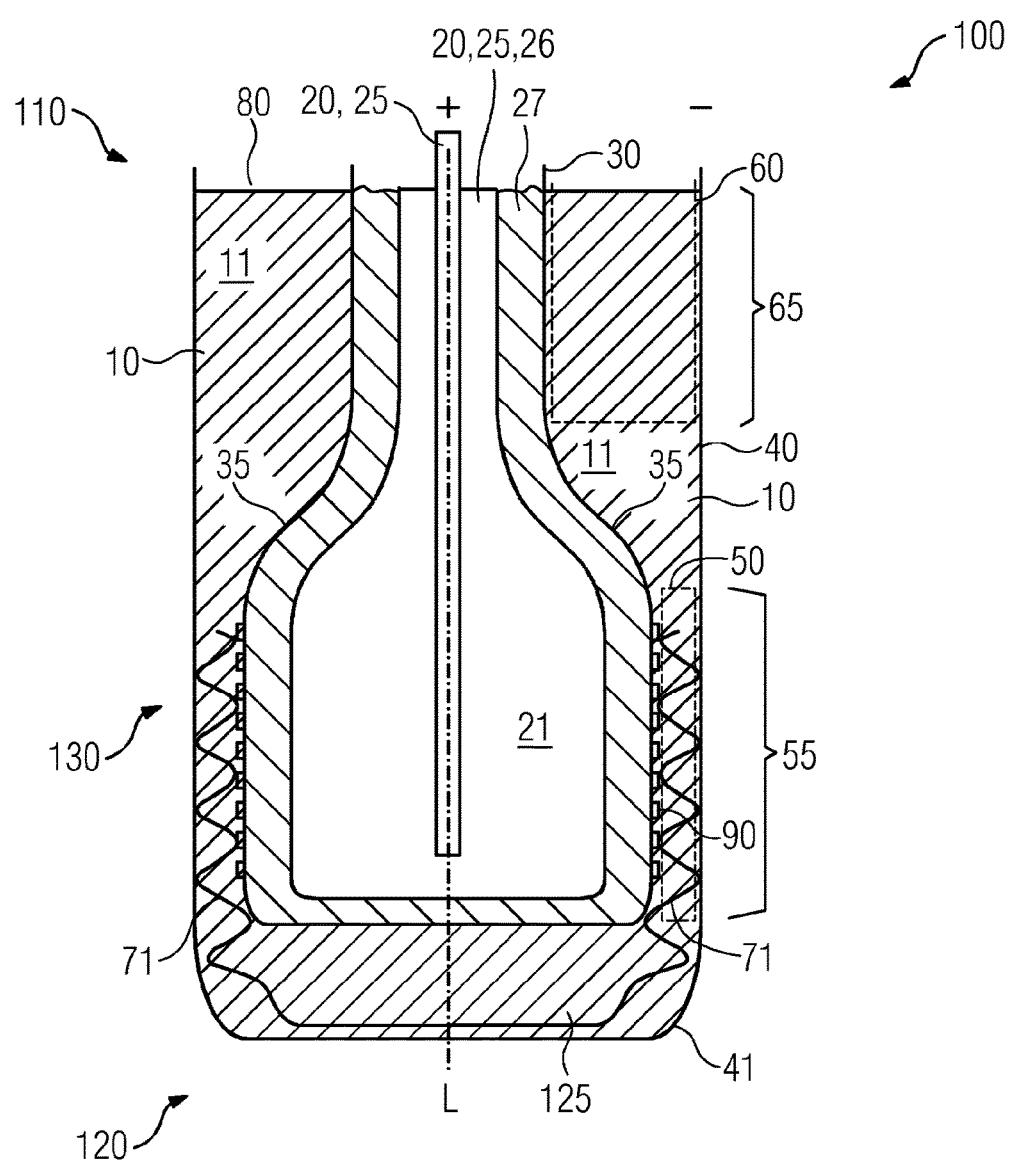
FIG. 3 shows a further embodiment of the electrochemical storage device according to the invention in a schematic diagram as a lateral sectional view through the central longitudinal axis.

FIG. 3 shows a further possible embodiment of the electrochemical storage device 100 according to the invention which however differs from the embodiment shown in FIG. 2 in that the wall 40 of the side part 130 does not have a formed portion 45, but the shape of the solid electrolyte 30 is modified between the top part 110 and the bottom part 120 thereof in such a manner that a first region 50 close to the bottom part 120 and a second region 60 close to the top part 110 are in turn formed in the anode compartment 11. The solid electrolyte 30 here has a change in shape 35 between the top part 110 and bottom part 120. The first region 50 arranged closer to the bottom part 120 is determined by the wall 40 of the side part 130 and by the surface of the solid electrolyte 30 below the change in shape 35. Above the change in shape 35, the solid electrolyte has a relatively smaller circumference, such that the second region 60 occupies a larger volume in comparison with the first region 50. In terms of the advantages for thermal conductivity through these regions 50 and 60, the embodiment shown in FIG. 3 is comparable to that shown in FIG. 2.

Figure 4:
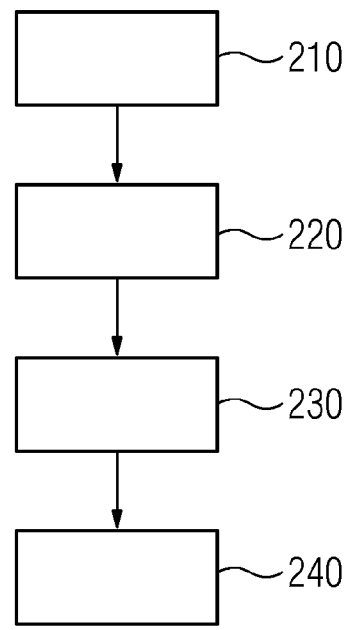
FIG. 4 shows an embodiment of the method according to the invention for producing an electrochemical storage device as a flow chart.

FIG. 4 shows a first embodiment of the method according to the invention for producing an electrochemical storage device, in particular an electrochemical storage device as previously described, which method comprises the following steps: —providing an ion-conductive solid electrolyte 30 (first method step 210); —providing a wall 40 (second method step 220); —forming the wall 40 (third method step 230) and —surrounding the solid electrolyte 30 with the formed wall 40 such that, on completion of the electrochemical storage device 100, there are provided between the wall 40 and solid electrolyte 30 at least one first region 50 of an anode compartment 11 and one second region 60 of an anode compartment 11, which two regions 50, 60 in each case differ by the spacing of the wall 40 from the solid electrolyte 30 (fourth method step 240).

Figure 5:
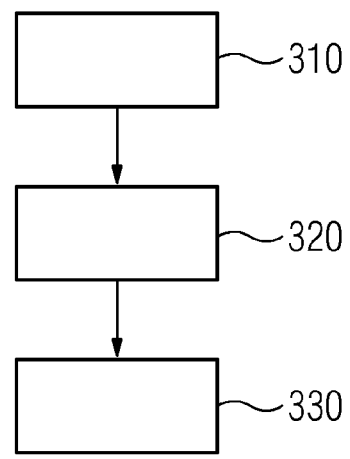
FIG. 5 shows a further embodiment of the method according to the invention for producing an electrochemical storage device as a flow chart.

FIG. 5 shows a further embodiment of the method according to the invention for producing an electrochemical storage device 100, in particular a previously described electrochemical storage device 100, which method comprises the following steps: —providing a solid electrolyte 30 which has a change in shape and is also ion-conductive (first method step 310); —providing a wall 40 (second method step 320); —surrounding the solid electrolyte 30 with the wall 40 such that, on completion of the electrochemical storage device 100, there are provided between the wall 40 and solid electrolyte 30 at least one first region 50 of an anode compartment 11 and one second region 60 of an anode compartment 11, which two regions 50, 60 in each case differ by the spacing of the wall 40 from the solid electrolyte 30 (fourth method step 330).

Further embodiments and features are revealed by the subclaims.

The invention claimed is:

1. An electrochemical storage device, comprising:
when in ordinary operation, an anode compartment filled with an anode material and a cathode compartment filled with a cathode material, wherein the anode compartment is separated from the cathode compartment by an ion-conductive solid electrolyte, and wherein the anode compartment is delimited on one side at least in part by the solid electrolyte and on another side at least in part by a wall which surrounds the solid electrolyte at least in part,
wherein the electrochemical storage device has a top part, at which electrical energy may be fed in or out, a bottom part arranged opposite the top part, and at least one side part which comprises the at least one wall and is arranged between the top part and bottom part, wherein there are provided between the wall and solid electrolyte at least one first region and one second region, which two regions differ by the respective spacing of the wall from the solid electrolyte,
wherein the first region is arranged closer to the bottom part and the second region is arranged closer to the top part and in the second region the wall is spaced further from the solid electrolyte than the wall is spaced from the solid electrolyte in the first region, and in that the first region has a substantially uniform spacing between the wall and the solid electrolyte,
wherein the solid electrolyte has a change in shape which separates the first region and the second region from one another and wherein a longitudinal axis of the electrochemical storage device is an axis of symmetry of the solid electrolyte and an axis of symmetry of the wall
and wherein the axis of symmetry is an axis of rotational symmetry such that surface symmetry is present in a plane that bisects the axis of rotational symmetry at a right angle.

2. The electrochemical storage device as claimed in claim 1, wherein a transition from the first region to the second region has a taper of the spacing between the wall and the solid electrolyte.

3. The electrochemical storage device as claimed in claim 1, wherein the first region and the second region are in each case differently spaced from the top part and the bottom part.

4. The electrochemical storage device as claimed in claim 1, wherein the second region has a plurality of tapers of the spacing between the wall and the solid electrolyte.

5. The electrochemical storage device as claimed in claim 1, wherein the wall is comprised of a can which at least in part surrounds the solid electrolyte.

6. The electrochemical storage device as claimed in claim 1, wherein the wall is spaced from the solid electrolyte in the first region by at most 3 mm.

7. The electrochemical storage device as claimed in claim 1, wherein the wall is spaced from the solid electrolyte in the second region by on average at least 4 mm.

8. The electrochemical storage device as claimed in claim 1, wherein a ratio of a spatial volume which is determined by the first region between the wall and solid electrolyte to a spatial volume which is determined by the second region between the wall and solid electrolyte is at most 60%.

9. The electrochemical storage device as claimed in claim 1,
wherein a space which is determined by the first region between the wall and solid electrolyte is completely filled by anode material when the electrochemical storage device is at full charge,
wherein a space which is determined by the second region between the wall and solid electrolyte is filled only in part by anode material.

10. The electrochemical storage device as claimed in claim 1, wherein a space which is determined by the first region between the wall and solid electrolyte is completely filled by anode material at just 60% of a full charge of the electrochemical storage device.

11. The electrochemical storage device as claimed in claim 1, wherein the wall is spaced from the solid electrolyte in the first region by at most 1.5 mm.

12. The electrochemical storage device as claimed in claim 1, wherein a ratio of a spatial volume which is determined by the first region between the wall and solid electrolyte to a spatial volume which is determined by the second region between the wall and solid electrolyte is at most 30%.

13. The electrochemical storage device as claimed in claim 1, wherein the second region extends from the change in shape to the top part.

14. The electrochemical storage device as claimed in claim 1, wherein the electrode and the one second region extend to the top part of the electrochemical storage device.

15. A method for producing the electrochemical storage device of claim 1, the method comprising:
providing the solid electrolyte which has the change in shape and is also ion-conductive;
providing the wall;
surrounding the solid electrolyte with the wall such that, on completion of the electrochemical storage device, there are provided between the wall and solid electrolyte the at least one first region of the anode compartment and the second region of the anode compartment, which two regions in each case differ by the spacing of the wall from the solid electrolyte in such a manner that the first region is arranged closer to the bottom part and the second region is arranged closer to the top part and in the second region the wall is spaced further from the solid electrolyte than in the first region, and that the first region has a substantially uniform spacing between the wall and the solid electrolyte.

* * * * *